Jan. 24, 1950

M. J. IATESTA 2,495,258

ELECTRONIC VACUUM TUBE

Filed Dec. 9, 1946

*INVENTOR.*
MATTHEW J. IATESTA
BY
*F. J. Schmitt*
ATTORNEY

Patented Jan. 24, 1950

2,495,258

UNITED STATES PATENT OFFICE 2,495,258

ELECTRONIC VACUUM TUBE

Matthew J. Iatesta, Philadelphia, Pa.

Application December 9, 1946, Serial No. 715,124

1 Claim. (Cl. 250—27.5)

(Granted under the act of March 3, 1883, as amended April 30, 1928; 370 O. G. 757)

This invention relates to a new and useful improvement in a vacuum tube for electronic signal pick-up or as a detector of amplitude and frequency motions, such as acceleration and vibration, etc.

For instance, it may be desirable to magnify the infinitesimal motions of a stylus as it sensitively follows the identations on a phonograph record, so that these may be reproduced in sound and amplified.

In the mechanism of this invention the space between the plate anode and the cathode of a vacuum tube is varied, thus varying the conductivity of the tube and its electronic impulses. The stylus supporting member at the base of the vacuum tube is a flexible bellows or corrugated diaphragm of any suitable material, such as metal, so that the said stylus supporting member has an allowable lateral motion without any leakage of air into the interior of the said vacuum tube.

The principal object of this invention is to cause a variable resistance in the pick-up circuit of a vacuum tube and thereby vary the resistance of the said vacuum tube by the relative movement of any of its elements, such as the cathode, the grids, as well as the anode or plate, and also as a dual tube with a movable element in each section having the elements wired into a single bridge circuit, for greater sensitivity. The figure as drawn shows a stylus attached to a semicircular plate anode and illustrates only one simple form of this invention.

Another object of this invention is its use for the measurement of acceleration. In such an application the movable element would be connected to the accelerated mass so that as the vacuum tube, with its attached mass, is accelerated or decelerated the inertia effect of the attached mass will cause the distance between the attached elements to vary and thereby vary the resistance of the vacuum tube with a resulting variation in the electrical output.

Still another object of this invention is to measure the amplitude and frequency of vibration in which the movable element of the vacuum tube is suitably connected to the vibrating object and a change in the resistance caused by said moving element affects the conductivity of the said vacuum tube, so that a recording of the said vibration amplitude and frequency can be made on an oscillograph or other similar apparatus.

A still further object of this invention is to so design the vacuum tube as to take into account the natural resonant frequency of the whole assembly with proper damping for the device to dampen out the undesirable vibrations, etc.

A still further object of this invention is to so design a stylus in its supporting element of a vacuum tube that it can be either a permanent portion of the supporting element or a replaceable element as desired.

These and other objects of this invention, and the various features and details of the construction, operation and use thereof, are hereinafter more fully set forth and described with reference to the accompanying drawing in which like numbers refer to like parts and in which.

Figure 1:
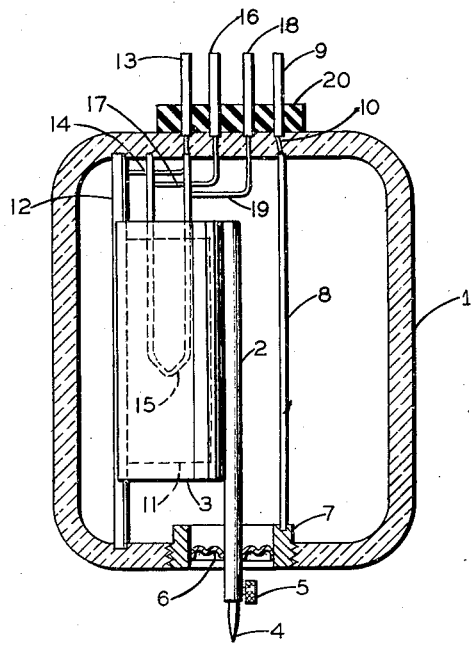
Fig. 1 is a partial longitudinal cross section through the center line of a vacuum tube, showing the central anode and attached plate.
Figure 2:
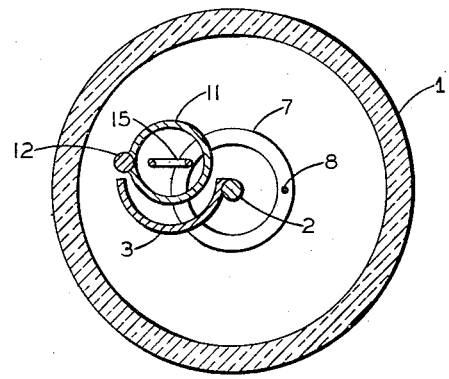
Fig. 2 is a transverse cross section taken midway between the bottom and top of the vacuum tube.

Referring now to Fig. 1 and Fig. 2 of the drawing, numeral 1 refers to the tube or envelope of an insulating material, such as glass, for instance, and 2 refers to the anode support which is integral with the semi-cylindrical anode 3 and in which is fastened stylus 4 by set screws 5. Flexible bellows or diaphragms 6 is fastened to metal sealing ring 7 and hermetically seals anode support 2 in the tube 1. Rod 8 connects anode through sealing ring 7 to vacuum tube pin 9 by wire 10. Tubular or cylindrical cathode 11 is supported by and integral with rod 12, which is connected to vacuum tube pin 13 by wire 14. Heater 15 connects at one end to tube pin 16 by wire 17, and tube pin 18 connects to the opposite end of heater 15 by wire 19. 20 is a standard insulated terminal or base with pins arranged to match a standard cable socket.

While a particular embodiment of this invention has been illustrated and described herein, it is not intended that this invention be limited to such disclosure, and changes and modifications may be made and incorporated within the scope of the claim.

The invention described herein may be manufactured and used by or for the Government of the United States of America for governmental purposes without the payment of any royalties thereon or therefor.

What I claim is:

An electronic vacuum tube comprising an insulating envelope, a tubular cathode mounted on an insulating base fixed to said envelope, filament means positioned within said tubular cathode and mounted on said base, a metal flexible diaphragm positioned in an opening in said envelope opposite said base and centrally supporting a stylus externally of said envelope, a semi-cylindrical anode adjacent said cathode in said envelope supported on said diaphragm for limited movement with respect to said cathode, and separated electrical connections through said base to said filament means, said cathode and said anode.

MATTHEW J. IATESTA.

REFERENCES CITED

The following references are of record in the file of this patent:

UNITED STATES PATENTS

| Number | Name | Date |
|---|---|---|
| 2,142,857 | McArthur | Jan. 3, 1939 |
| 2,165,981 | Sampson | July 11, 1939 |
| 2,407,979 | Findlay | Sept. 24, 1946 |
| 2,442,862 | Salinger | June 8, 1948 |